July 23, 1968 H. E. FERRILL 3,393,702
OUTSIDE BEVEL SEAT SAFETY RELIEF VALVE
Filed Feb. 23, 1965 2 Sheets-Sheet 1

INVENTOR.
Homer E. Ferrill
BY
George H. Baldwin
ATTORNEY ically and concentric with the axis of the nozzle. The
valve body is provided with an internal chamber 18 pro-

United States Patent Office 3,393,702
Patented July 23, 1968

3,393,702
OUTSIDE BEVEL SEAT SAFETY RELIEF VALVE
Homer E. Ferrill, Alexandria, La., assignor to Dresser Industries, Inc., Dallas, Tex., a corporation of Delaware
Filed Feb. 23, 1965, Ser. No. 434,230
8 Claims. (Cl. 137—536)

ABSTRACT OF THE DISCLOSURE

A safety relief valve of the type having an outside bevel seat for the relief of system overpressure. Crucial structural relationships of components permit small diameter capacities for this valve type and freedom in the disc support enables seating self-alignment.

---

This invention relates to a novel and improved safety relief valve.

Safety relief valves are used to relieve the fluid pressure of a gas or liquid as opposed to safety valves used on steam service. Also safety relief valves are generally smaller than safety valves and present problems in incorporating in a small compact value various features which are simpler to provide in a larger overall structure. For example, small spring-loaded safety relief valves have heretofore been provided with inside bevel seats, which are more susceptible to trapping of foreign substances in the fluid going over the seat and are inherently less tight than outside bevel seats. While it is known to provide outside bevel seats on safety valves, the structure for guiding the valve disc has had a relatively large diameter as compared to the diameter of the valve seat, so that such designs were not suited to compact small safety relief valves and were not particularly suitable for the incorporation of bellows to provide a balanced bellows valve. Also, in conventional safety relief valves, having relatively small diameter disc guides, the spring-biased spindle acting on the disc to close the valve bears on the disc or member supporting the same at a point located a very substantial distance above the valve seat, then tending to encourage misalignment of the disc and seat.

Accordingly, it is the object of the present invention to provide a novel and improved outside bevel seat safety relief valve, which is of compact construction making it suitable for fabrication in a small diameter inlet sizes, while at the same time provides a tight seal between the disc and seat, will compensate for misalignment of the disc and seat, and is at the same time capable of incorporating a bellows to provide a balanced bellows value.

Figure 1:
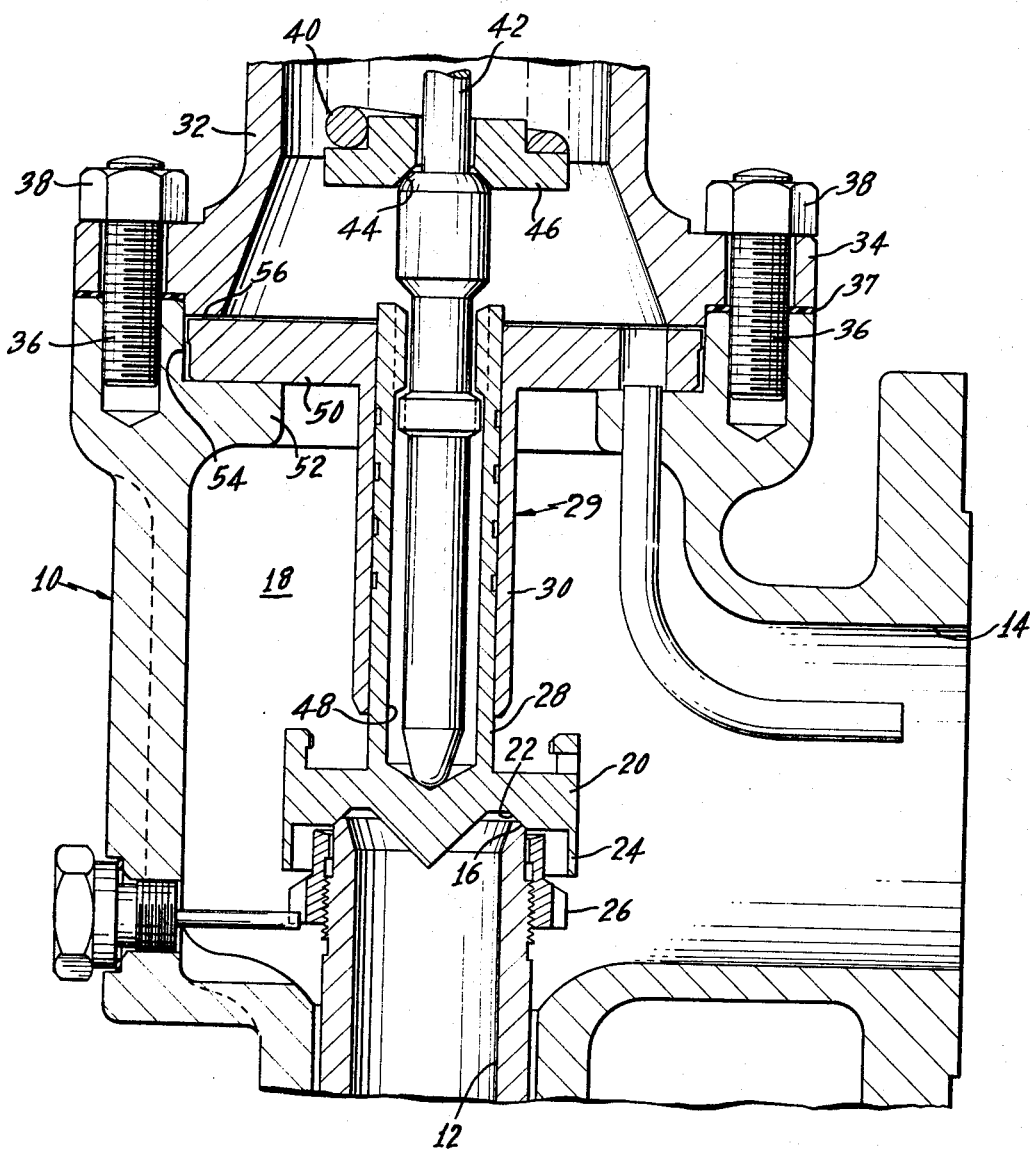
Figure 2:
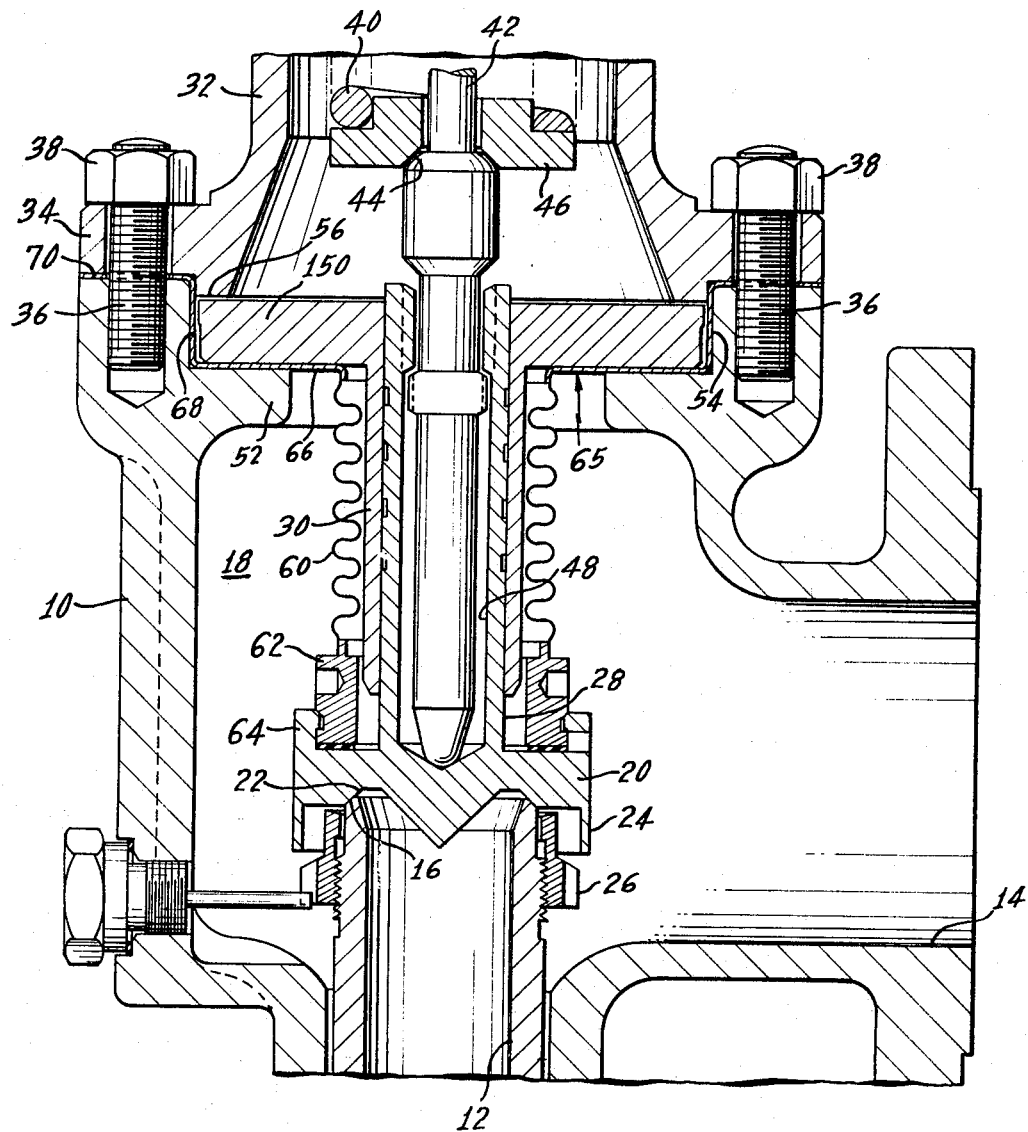

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

FIG. 1 is a fragmentary, elevational view, in section, of a safety relief valve incorporating the present invention, and FIG. 2 is an elevational view, in section, of the valve of FIG. 1, modified to incorporate a bellows to provide a balanced bellows valve.

With reference to the drawings, a safety relief valve incorporating the present invention comprises a valve body 10 having an inlet nozzle 12 inserted within an opening in the valve body. The body 10 has an outlet passage 14 extending at right angles to the inlet. The nozzle 12 has at its upper end an outside bevel seat 16 which is frustoconical and concentric with the axis of the nozzle. The valve body is provided with an internal chamber 18 providing communication between the nozzle and the outlet 14 in the valve body. The valve is closed by a valve disc 20 having a female conical surface, as at 22, which is engaged over and with the conical outside bevel seat 16 on the nozzle. As is conventional, the valve disc 20 has a depending annular skirt 24 surrounding and spaced outwardly of the nozzle 12, and an adjusting ring 26 is adjustably mounted on the outside of the nozzle for movement toward and away from the valve seat.

In the specific embodiment shown the valve disc 20 has a tubular stem 28 extending coaxially therefrom and upwardly and away from the valve seat. The stem is supported for vertical movement toward and away from the valve seat by a disc guide comprising a sleeve 30 within which the stem 28 is slidably engaged. In accordance with one aspect of the invention, the inner surface of the guide sleeve 30 which is engageable with the outer surface of the stem 28 is of a small diameter as compared to the diameter of the valve seat, and the guide sleeve has a wall thickness which is small to provide a compact guide structure, particularly suited for use with valves of small nozzle diameters. Particularly, it will be seen that in the specific embodiment of FIGS. 1 and 2 the outer diameter of the stem, and thus the inner diameter of the sleeve 30, is less than the inner diameter of the nozzle 12 and is therefore substantially less than the outer diameter of the bevel seat 16. Further, it will be seen that the outer diameter of the sleeve 30 is no greater than the outer diameter of the bevel seat 16 and is preferably less than the inner diameter of the seat. Additionally, it will be observed from a consideration of FIGS. 1 and 2 that the bearing surface between the stem 28 and guide sleeve 30 has a length-to-diameter ratio greater than 2-to-1 and in the specific embodiment shown approximates 3-to-1, thus assuring accurate guiding of the stem. In this connection, when the valve is closed it will be observed that the upper end of the stem 28 is disposed closely adjacent and slightly above the upper end of the bearing surface in the guide 29. It also will be observed that the lower end of the guide sleeve 30 terminates above the valve seat and is engageable with the top surface of the valve disc to provide a positive limit stop for the disc in its upward movement.

The values of FIGS. 1 and 2 each further comprises a bonnet 32 having adjacent its lower end a radially outwardly extending flange 34. The bonnet is mounted on the valve body by means of a plurality of studs 36 engaged at one end in the valve body and extending upwardly through openings in the flange 34 for engagement with nuts 38 for clamping the bonnet onto the body. A gasket or seal 37 is clamped betwen the body 10 and flange 34 on the bonnet of the valve of FIG. 1. As is more or less conventional, the bonnet 32 of the valves of FIGS. 1 and 2 houses a pre-loaded compression coil spring 40 which is generally arranged coaxially of the bonnet and the valve seat. Extending generally coaxially through the spring 40 is a spindle 42. The spindle is provided with a radially outwardly extending rounded shoulder 44 disposed intermediate its ends and facing generally toward the upper end of the bonnet. A spring washer 46 is arranged over the spindle and has a conical recess which engages over the shoulder 44 on the spindle. The spring 40 bears on the washer 46 which, in turn, bears on the spindle 42, whereby the spring 40 urges the spindle 42 downwardly in the direction of the valve seat so as to tend to maintain the valve closed. The upper end of the spindle (not shown) is operatively associated with means for adjustably pre-loading the coil spring 40, an amount selected to provide for opening of the valve disc in response to a pre-determined fluid pressure in the nozzle 12 acting on the underside of the valve disc.

With further reference to FIGS. 1 and 2, the disc stem 28 is provided with a recess 48 extending from the upper end of the stem and coaxially thereof to terminate closely adjacent the valve seat and between the lower end of the disc guide sleeve 30 and the valve seat. The lower end of the spindle 42 which extends into and is bottomed in the recess 48 is rounded and is seated on the generally conical bottom of the recess 48. Also, the portion of the spindle 42 received in recess 48 is spaced from the walls of the recess which, together with the configuration of the lower end of the spindle and the bottom of the recess 48, will permit limited universal tilting movement of the spindle relative to the stem to correct for misalignment of the axes of the spindle and the valve disc.

With reference to FIG. 1, the disc guide 30 has adjacent its upper end a radially outwardly extending flange 50. The valve body is provided with a radially inwardly extending lip or flange 52 adjacent its upper end which provides an upwardly facing horizontally extending surface or shoulder on which the flange 50 rests, so as to provide for vertical support of the disc guide within the valve. The valve body is further provided with a vertically extending annular surface 54 which surrounds the periphery of the flange 50 and, in accordance with one aspect of the invention is spaced, radially outwardly therefrom a small amount on the order of a few thousandths of an inch so as to permit the flange 50, and thus disc guide 29, a limited amount of movement radially of the axes of the disc guide and valve seat. The bonnet 32 is provided adjacent its lower end with an annular downwardly facing and horizontally extending surface 56 which overlies the top surface of the flange 50 adjacent the outer periphery thereof. The surface 56 on the bonnet is spaced slightly from the flange 50, for example, on the order of a few thousandths of an inch, whereby the disc guide is retained in assembly with the valve bonnet and body, while at the same time, due to the clearance between the top surface of the flange 50 and the bonnet surface 56 and the cleaarnce between the periphery of the flange 50 and the vertically extending surface 54 on the valve body, the disc guide will be permitted to have a limited amount of universal tilting movement generally relative to the axis of the valve seat. Accordingly, the disc stem 28, which is closely guided within the sleeve 30, is permitted a limited amount of movement both in a radial direction and in a universal tilting manner to compensate for any irregularities or misalignments between the valve disc and the valve seat, thus assuring a tight seal between the disc and seat.

In a balanced bellows type valve of FIG. 2, a bellows 60 is arranged coaxially over and about the guide sleeve 30. The lower end of the bellows is anchored in fluid tight relation to a ring 62 threadedly mounted on an upstanding flange 64 on the valve disc 20. The upper end of the bellows is anchored in sealed relation to a flange member 65 comprising a generally annular inner portion 66 arranged coaxially over and extending radially outwardly of the guide sleeve 30 with its inner diameter end portion fixed in sealed relation to the upper end of the bellows 60. The inner portion 66 of the flange member 65 rests upon the upwardly facing shoulder formed by the radially inwardly extending projection 52 on the valve body and terminates at its outer end in a vertically extending annular intermediate portion 68 which nests within the generally annular recess formed by the vertical surface 54 on the valve body. The upper end of the annular intermediate portion 68 of the flange member 65 terminates in an annular, radially outwardly extending outer portion 70 which is clamped between the body 10 and flange 34 on the bonnet, to provide a fluid seal therebetween. The guide sleeve 30 of the valve of FIG. 2 has adjacent its upper end a radially outwardly extending flange 150 similar to the flange 50 previously described in connection with valve of FIG. 1. The flange 150 rests upon the upwardly facing surface of the annular inner portion 66 of the flange member 65 which supports the bellows. The upper surface of the inner portion 66 of the flange member 65 is spaced from the overlying surface 56 on the bonnet 32 in a manner and for the same purpose as described in connection with the valve of FIG. 1. Additionally, the periphery of the flange 150 is spaced radially inwardly of and from the inner surface of the intermediate portion 68 of the flange member 65, also for the same purpose as described in connection with the spacing of the flange 50 from the vertical surface 54 in the valve of FIG. 1. Accordingly, it will be seen that the valve of FIG. 2 while being a balanced bellows type has all the advantages and features of the valve of FIG. 1 without any increase in size. Also, it should be particularly noted that the flange member 65 performs several functions. As will be apparent, the flange member supports the upper end of the bellows but, in addition, the imperforate, horizontally and vertically extending inner and intermediate portions 66 and 68 of the flange member provide an effective seal to prevent fluid flow communication between the chamber 18 within the valve body and the interior of the bonnet 32, while at the same time permit the radial and universal tilting movement of the flange 150 of the disc guide. Further, the outer horizontal portion 70 of the flange member not only serves to anchor the flange member on the body but also serves as a seal or gasket between the bonnet and body, thus eliminating a separate seal such as at 37 in FIG. 1.

It will be seen that there has been provided a novel and improved safety relief valve having an outside bevel seat, with all the attendant advantages of this type of seat, while at the same time having a compact disc guiding structure heretofore not associated with conventional outside bevel seat valves, thus making the valve susceptible of manufacture in small diameter sizes. The disc guiding structure provides improved alignment of the disc and seat, and automatically compensates for minor misalignments, all within a compact arrangement. Lastly, the basis disc-guiding and supporting structure is particularly adapted to a balanced bellows valve without sacrificing any of the features of the improved valve and novel and improved means have been provided for mounting the upper end of the bellows so as not to interfere with the floating disc guide feature of the basic valve.

While only certain preferred embodiments of this invention have been shown and described by way of illustration, many modifications will occur to those skilled in the art and it is, therefore, desired that it be understood that it is intended in the appended claims to cover all such modifications as fall within the true spirit and scope of this invention.

What is claimed as new and what is desired to secure by Letters Patent of the United States is:

1. In a spring-loaded safety relief valve, a valve body providing a fluid passage between an inlet and an outlet and containing an outside bevel seat intermediate said inlet and outlet, a valve disc complementally engageable with said seat, said disc having an elongated stem extending from behind said disc coaxially thereof to an end away from said seat, a disc guide including an elongated sleeve slidably receiving and guiding said stem for movement toward and away from said seat, means supporting said sleeve on the valve body in a manner permitting seating self-alignment between said valve seat and disc, said sleeve having an outer diameter no greater than the outer diameter of said seat and having a length at least twice its inner diameter, the said end of said stem being disposed closely adjacent a corresponding end of said sleeve, said stem having a recess extending coaxially inwardly thereof from its said end and terminating past the other end of said sleeve closely behind said disc, and a spring-biased spindle extending axially into said stem recess against the terminating surface thereof.

2. In a spring-loaded safety relief valve, a valve body providing a fluid passage between an inlet and an outlet and containing an outside bevel seat intermediate said inlet and outlet, a valve disc complementally engageable with said seat, said disc having an elongated stem extending from behind said disc coaxially thereof to an end away from said seat, a disc guide including an elongated sleeve slidably receiving and guiding said stem for movement toward and away from said seat, means supporting said sleeve on the valve body for limited movement radially of the axis of said seat and for limited universal tilting movement relative to the axis of said seat in a manner permitting seating self-alignment between said valve seat and disc, said sleeve having an outer diameter no greater than the outer diameter of said seat and having a length which is larger as compared to its inner diameter, the said end of said stem being disposed closely adjacent the corresponding end of said sleeve, said stem having a recess extending coaxially inwardly thereof from its said end and terminating past the other end of said sleeve closely behind said disc, and a spring-biased spindle extending axially into said stem recess against the terminating surface thereof.

3. In a spring-loaded safety relief valve, a valve body providing a fluid passage between an inlet and an outlet and containing an outside bevel seat intermediate said inlet and outlet, a valve disc complementally engageable with said seat, said disc having a stem extending from behind said disc coaxially thereof to an end away from said seat, said stem having a coaxial recess extending from its said end and terminating closely behind said disc, a spring-biased spindle received within said recess ending against said recess termination, a disc guide including a sleeve within which said stem is slidably engaged and guided, said sleeve having an outer diameter no greater than the outer diameter of said seat and having a radially outwardly extending flange, means providing a shoulder on said body by which said flange is supported in an axial direction, said shoulder terminating at its outer end in a surface extending in an axial direction surrounding said flange in closely spaced relation, and a bonnet mounted on said body and having a surface extending in a radial direction opposite said flange in closely spaced relation, the spacing between said flange and said body and bonnet surfaces providing limited radial and universal tilting movement of said disc guide permitting seating self-alignment between said valve seat and disc.

4. In a spring-loaded safety relief valve, a valve body providing a fluid passage between an inlet and an outlet and containing an outside bevel seat intermediate said inlet and outlet, a valve disc complementally engageable with said seat, said disc having an elongated stem extending from behind said disc coaxially thereof to an end away from said seat, a disc guide including an elongated sleeve slidably receiving and guiding said stem for movement toward and away from said seat, said sleeve having an outer diameter no greater than the outer diameter of said seat and having a length no less than twice its inner diameter, said sleeve having at its end further from said seat a radially outwardly extending flange, means providing a shoulder on said body on which said flange is supported in an axial direction, said shoulder terminating at its outer end in a surface extending in an axial direction and surrounding said flange in closely spaced relation, a bonnet mounted on said body and having a surface extending in a radial direction opposite said flange in closely spaced relation, the spacing between said flange and said body and bonnet surfaces providing limited radial and universal tilting movement of said disc guide to permit seating self-alignment between said valve seat and disc, and said stem having a coaxial recess extending from its said end and terminating closely behind said disc and an axially extending spring-biased spindle having its one end portion received within said recess in radially spaced relation thereto rockably against said recess termination.

5. In a spring-loaded balanced bellows safety relief valve, a valve body providing a fluid passage between an inlet and an outlet, a bonnet supported on the body, a valve seat within the body intermediate said inlet and outlet, a valve disc engageable with said seat, a disc guide for guiding the movement of said disc toward and away from said seat, means for supporting the disc guide on the valve body and for maintaining the disc guide in assembly in the valve while permitting the disc guide to have limited radial and universal tilting movement generally relative to said seat, said disc support including a generally radially extending surface on the valve body supporting said disc in an axial direction, and a second surface extending in a generally axial direction on the valve body peripherally surrounding in close spaced relation the portion of said disc guide on said body guide supporting surface and a generally radially extending surface on the bonnet opposite the portion of said disc guide on said body guide supporting surface in closely spaced relation, a bellows mounted at one end on said disc guide extending in a direction away from said disc, and means supporting the other end of said bellows comprising a flange member having a first imperforate portion fixed to the bellows in fluid tight relation and extending between said guide supporting surface on the valve body and said disc guide, said first portion terminating in an imperforate second portion extending alongside said second surface on the valve body, said second portion terminating in a third portion clamped between said bonnet and body in fluid tight relation to provide a fluid seal between the bonnet and body.

6. In a spring-loaded balanced bellows safety relief valve, a valve body providing a fluid passage between an inlet and a outlet, a valve seat within said body intermediate said inlet and outlet, a valve disc engageable with said seat, said disc having a steam extending coaxially thereof away from said seat, a disc guide including a sleeve within which said stem is slidably engaged and guided, said sleeve having a radially outwardly extending flange, means providing a shoulder on said body by which said flange is supported, said shoulder terminating at its outer end in a wall surrounding the peripheral edge of said flange in spaced relation, a bonnet mounted on said body and having a surface extending opposite the face of said flange in closely spaced relation, a bellows disposed about said sleeve and fixed at one end to said disc, and means supporting the other end of said bellows comprising a flange member having a first imperforate annular portion fixed to said bellows and extending between said sleene flange and body shoulder, said first portion terminating a cylindrical imperforate second portion extending between said shoulder wall and said sleeve flange in closely spaced relation to said sleeve flange, said second portion terminating in an annular third portion clamped between said body and bonnet and providing a fluid seal therebetween.

7. In a spring-loaded balanced bellows safety relief valve, a valve body providing a fluid passage between an inlet and an outlet and containing an outside bevel seat intermediate said inlet and outlet, a valve disc complementally engageable with said seat, said disc having a stem extending coaxially thereof away from said seat, said stem having a coaxially recess extending from behind said disc to its other end, a spring-biased spindle received within said recess with an end of the spindle against the inwardmost end of said recess, a disc guide including a sleeve within which said stem is slideably engaged and guided, said sleeve having an outer diameter no greater than the outer diameter of said seat and having a radially outwardly extending flange, means providing a shoulder on said body by which said flange supports said guide, said shoulder terminating radially outward in a wall surrounding the peripheral edge of said flange in spaced relation, a bonnet mounted on said body and having a surface extending opposite the face of said flange in closely spaced relation, a bellows disposed about said sleeve and fixed at one end to said disc, and means supporting the other end of said bellows comprising a flange member having a first imperforate annular portion fixed to said bellows and extending between said sleeve flange and body shoulder, said first portion terminating in a cylindrical imperforate second portion extending between said shoulder wall and said sleeve flange in closely spaced relation to said sleeve flange, said second portion terminating in an annular third portion clamped between said body and bonnet and providing a fluid seal therebetween.

8. In a spring-loaded safety relief valve, a valve body providing a fluid passage between an inlet and outlet and containing an outside bevel seat intermediate said inlet and outlet, a valve disc complimentally engageable with said seat, said disc having an elongated stem extending coaxially thereof away from said seat, a disc guide including an elongated sleeve slidably receiving and guiding said stem for movement toward and away from said seat, said sleeve having an outer diameter no greater than the outer diameter of said seat and having a length no less than twice its inner diameter, said sleeve having adjacent its end furthest removed from said seat a radially outwardly extending flange, means providing a shoulder on said body on which said flange is supported, said shoulder terminating at its outer end in a wall surrounding the peripheral edge of said flange in spaced relation, a bonnet mounted on said body and having a surface extending opposite the face of said flange in closely spaced relation, said stem having a coaxial recess extending from behind said disc to its other end, a spring-biased spindle received within said recess in radially spaced relation thereto rockably engaging the inwardmost end of said recess, a bellows disposed about said sleeve and fixed at one end to said disc, and means supporting the other end of said bellows comprising a flange member having a first imperforate annular portion fixed to said bellows and extending between said sleeve flange and body shoulder, said first portion terminating in a cylindrical imperforate second portion extending between said shoulder wall and said sleeve flange in closely spaced relation to said sleeve flange, said second portion terminating in an annular third portion clamped between said body and bonnet and providing a fluid seal therebetween.

References Cited
UNITED STATES PATENTS

| | | | |
|---|---|---|---|
| 2,517,858 | 8/1950 | Farris | 137—478 X |
| 2,547,862 | 4/1951 | Gilmore | 137—478 |
| 2,878,828 | 3/1959 | Klafstad | 137—478 |

WILLIAM F. O'DEA, *Primary Examiner.*

H. W. WEAKLEY, *Assistant Examiner.*